United States Patent
Ma et al.

(10) Patent No.: US 11,322,923 B2
(45) Date of Patent: May 3, 2022

(54) OVERHEAD POWER DISTRIBUTION LINE

(71) Applicant: JIANGSU SHEMAR ELECTRIC CO., LTD., Nantong (CN)

(72) Inventors: Bin Ma, Nantong (CN); Dequan Li, Nantong (CN); Jie Yu, Nantong (CN); Jiang Fang, Nantong (CN); Qing Huang, Nantong (CN)

(73) Assignee: JIANGSU SHEMAR ELECTRIC CO., LTD., Nantong (CN)

( * ) Notice: Subject to any disclaimer, the term of this patent is extended or adjusted under 35 U.S.C. 154(b) by 1 day.

(21) Appl. No.: 16/759,112

(22) PCT Filed: Sep. 29, 2018

(86) PCT No.: PCT/CN2018/108772
§ 371 (c)(1),
(2) Date: Apr. 24, 2020

(87) PCT Pub. No.: WO2019/085706
PCT Pub. Date: May 9, 2019

(65) Prior Publication Data
US 2020/0350753 A1    Nov. 5, 2020

(30) Foreign Application Priority Data
Oct. 30, 2017 (CN) .......................... 201711033404.0

(51) Int. Cl.
*H02G 7/20* (2006.01)
*E04H 12/24* (2006.01)

(52) U.S. Cl.
CPC ............... *H02G 7/20* (2013.01); *E04H 12/24* (2013.01)

(58) Field of Classification Search
CPC .......... H02G 7/20; H02G 7/205; H02G 7/22; H02G 7/00; H02G 7/02; H02G 7/04;
(Continued)

(56) References Cited

U.S. PATENT DOCUMENTS

| | | | | |
|---|---|---|---|---|
| 5,777,262 A | * | 7/1998 | Nourai | H02G 7/20 174/40 R |
| 8,895,861 B2 | * | 11/2014 | Cotton | H02G 3/24 174/158 R |

(Continued)

FOREIGN PATENT DOCUMENTS

| | | |
|---|---|---|
| CN | 201307742 Y | 9/2009 |
| CN | 202997476 U | 6/2013 |

(Continued)

OTHER PUBLICATIONS

International Search Report for Application No. PCT/CN2018/108772 dated Dec. 28, 2018, 4 pages.
(Continued)

*Primary Examiner* — Angel R Estrada
(74) *Attorney, Agent, or Firm* — Seyfarth Shaw LLP

(57) ABSTRACT

An overhead power distribution line (10) comprises a tension resistant pole (101), two composite crossbeams (102) and tension resistant fixing members (103). A middle portion of the composite crossbeam (102) is horizontally secured on the tension resistant pole (101), and end portions of the composite crossbeam (102) are connected to the tension resistant fixing members (103). The tension resistant fixing members (103) enable the two composite crossbeams (102) to integrally connect and are for fixing conducting lines. With the above configuration, two composite crossbeams (102) are secured on the same horizontal plane of the tension resistant pole (101), thus satisfying vertical tension of a tension resistant requirement. Further, by using composited crossbeam bodies (102), a dry arc distance is significantly increased, and electrical lightning resistance performance is enhanced, preventing incidents such as line disconnection and flashover caused by lightning strike. The composite crossbeams (102) are maintenance-free and do not require periodical inspection and maintenance, significantly reduc-
(Continued)

ing labor costs. The use of crossbeams (102) can further eliminate the use of tension insulators and simplify the structure of lines.

11 Claims, 9 Drawing Sheets

(58) Field of Classification Search
CPC .......... H02G 7/05; H02G 7/053; H02G 7/12; H02G 7/125; H02G 7/14; H02G 7/056; H02G 1/02; E04H 12/24; E04H 12/10
USPC ............ 174/45 R, 40 R, 137 R, 138 R, 135, 174/138 G, 140 R
See application file for complete search history.

(56) References Cited

U.S. PATENT DOCUMENTS

| 8,952,251 | B2 * | 2/2015 | Fulk | ............ | H02G 7/20 |
| | | | | | 174/45 TD |
| 9,698,585 | B2 * | 7/2017 | Ma | ............ | E04H 12/02 |
| 10,205,312 | B2 * | 2/2019 | Ma | ............ | E04H 12/34 |

FOREIGN PATENT DOCUMENTS

| CN | 203942244 | U | 11/2014 |
|---|---|---|---|
| CN | 103944125 | B | 5/2016 |
| CN | 205791383 | U | 12/2016 |
| CN | 205791385 | U | 12/2016 |
| CN | 205882560 | U | 1/2017 |
| CN | 205908090 | U | 1/2017 |
| CN | 106972441 | A | 7/2017 |
| CN | 107165466 | A | 9/2017 |
| CN | 107706871 | A | 2/2018 |
| CN | 207368625 | U | 5/2018 |
| EP | 184531 | A1 | 6/1986 |
| JP | S6035855 | U | 3/1985 |
| JP | 2002152934 | A | 5/2002 |
| KR | 200207523 | Y1 | 12/2000 |
| KR | 20060023620 | A | 3/2006 |
| KR | 101394095 | B1 | 5/2014 |

OTHER PUBLICATIONS

Chinese Office Action for Application No. 20171 1033404.0 dated May 7, 2019, 4 pages.
Chinese Office Action for Application No. 201711033404.0 dated Jul. 16, 2019, 6 pages.
Indian Examination Report for Application No. 202037017352 dated Mar. 11, 2021, 5 pages.
European Search Report for corresponding European Application No. 18874151.6 dated Jul. 6, 2021, 9 pages.
Canadian Office Action for corresponding Canadian Application No. 3,080,416 dated Jun. 1, 2021, 9 pages.
Canadian Office Action for corresponding Application No. 3,080,416 dated Jan. 5, 2022, 9 pages.

* cited by examiner

OVERHEAD POWER DISTRIBUTION LINE

CROSS REFERENCE TO RELATED APPLICATIONS

This is a U.S. National Stage application of, and claims priority to, PCT/CN2018/108772, filed Sep. 29, 2018, which further claims priority to Chinese Patent Application No. 201711033404.0, filed Oct. 30, 2017, the disclosures of which are incorporated herein by reference in their entirety.

TECHNICAL FIELD

The present disclosure relates to the technical field of overhead lines, and more particularly to an overhead power distribution line.

BACKGROUND

With the starting of the transformation of the power distribution network in recent years, 10 kV overhead insulated line systems have gradually adopted insulated conducting wires. Compared with bare conducting wires, the insulated conducting wires have superior insulation performance, which can effectively prevent an inter-phase short circuit fault caused by an external object and improve reliability of safe in power supply and voltage quality, however, lightning-caused breakings which would threaten human safety and cause huge property economic losses, have often occurred since the use of insulated conducting wires. In order to solve the technical problems mentioned above, a series of lightning protection measures are currently implemented mainly by means of adding lightning arresters or anti-lightning insulators. However, the added lightning arresters or anti-lightning insulators cause poor stability and require regular inspection and maintenance, which consumes a lot of labor costs.

SUMMARY

An objective of the present disclosure is to provide an overhead power distribution line, which can reduce the lightning strike disconnection accident in the existing power distribution network, improve the lightning protection stability, and reduce the cost of inspection and maintenance.

To achieve the above objective, an overhead power distribution line according to the present disclosure is provided. The overhead power distribution line includes: a strain power rod, two composite crossarms and a strain fixture.

A middle portion of the composite crossarm is horizontally fixed to the strain power pole, and ends of the composite crossarms are connected to the strain fixture. The strain fixture enables the two composite crossarms to be integrally connected, and are adapted to fix a conducting wire.

In a power distribution network, two composite crossarms are fixed on a same horizontal plane of the strain power pole, so that when a conducting wire passes through the strain fixture for fixation, the two composite crossarms can share the longitudinal strain required by the line to satisfy requirements of use. Further, with the composite of the bodies of the composited crossarms, a dry arcing distance is significantly increased, and electrical lightning resistance performance is enhanced, preventing accidents such as line disconnection and flashover caused by lightning strike. The composite crossarms are maintenance-free and do not require periodical inspection and maintenance, so labor cost is significantly reduced. The use of composite crossarms can also eliminate the use of strain insulators and simplify the configuration of the line.

In an embodiment, the composite crossarm includes a core rod, a sleeve, and a silicone rubber shed. Both the sleeve and the silicone rubber shed are wrapped on an outer circumferential surface of the core rod. After the sleeve is wrapped and fixed on the outer circumferential surface of the core rod, the silicone rubber shed is formed on the core rod at areas other than the sleeve.

The outer insulation of the composite crossarm uses the silicon rubber shed which has good aging resistance, and stable and reliable electrical performance, and can achieve a maintenance-free life cycle of thirty years. Meanwhile, before the silicon rubber shed is wrapped on the core rod, the sleeve is sleeved on the core rod first, so that the force experienced by the composite crossarm when it is fixed to the strain power pole acts on the sleeve. In this way, damage to the silicone rubber shed can be avoided, and corrosion of the core rod due to the external moisture can be prevented.

In an embodiment, the core rod is a glass fiber reinforced epoxy resin pultrusion rod.

In an embodiment, the core rod is a hollow tube or a solid rod, and the core rod has a cross section in a shape of one of a rectangle, a circle, and a polygon.

In an embodiment, two top-phase crossarms are further provided. The top-phase crossarm is vertically fixed to a top end of the strain power pole away from the ground. Ends of the top crossarms are connected to a top-phase strain fixture. The top-phase strain fixture enables the two top-phase crossarms to be integrally connected, and the top-phase strain fixture is adapted to fix a conducting wire.

The two top-phase crossarms fixed to the top end of the strain power pole can form a single loop three-phase strain power distribution network line with the two composite crossarms. The line has a stable and reliable structure and a high lightning resistance.

In an embodiment, the top-phase crossarm is a composite insulator.

In an embodiment, a pin type insulator is fixed on the strain fixture, and the pin type insulator is located in middle of two composite crossarms and adapted to support the conducting wire.

In an embodiment, the strain fixture includes an angle steel, first and second conducting wire clamps located on both sides of the angle steel, and two hoops disposed on the angle steel. The angle steel cooperates with the two hoops to enable the two composite crossarms to be integrally connected. The first and second conducting wire clamps are adapted to fix the conducting wire.

In an embodiment, end fittings are fixed to the ends of the composite crossarm, and the two hoops are fixedly connected to the angle steel after being sleeved on the corresponding end fittings of the two composite crossarms respectively.

The strain fixture is fixed on the end fittings of the composite crossarm, so that damage to the body of the composite crossarm can be avoided, and corrosion of body of the composite crossarm due to the moisture can be prevented.

In an embodiment, the composite crossarm is fixed to the strain power pole through a fixing device. The fixing device includes a crossarm receiving member, a pole connecting member, and a connecting plate. The crossarm receiving member is wrapped and fixed on the composite crossarm, the pole connecting member is fixed on the strain power pole, and the connecting plate is located between the composite crossarm and the strain power pole. The connecting plate is adapted to fix the crossarm receiving member and the pole connecting member.

In an embodiment, the crossarm receiving part is in a form of two U-shaped hoops, the two U-shaped hoops are arranged on both sides of the strain power pole respectively, and the pole connecting member is in a form of four bolts. The connecting plate is provided with first mounting holes corresponding to the two U-shaped hoops and second mounting holes corresponding to the four bolts.

When the two composite crossarms are horizontally arranged on the strain power pole, each of the composite crossarms corresponds to two U-shaped hoops and a connecting plate. The two composite crossarms share four bolts. The two U-shaped hoops pass through the first mounting holes in the connecting plate such that the composite crossarm is fixed on the connection plate. The four bolts pass through the connecting plates on both sides of the strain power pole respectively such that both the two composite crossarms are fixed on the strain power pole.

In this way, the two composite crossarms share a same pole connecting member, which can greatly simplify the fixing device, reduce the complexity of construction, and facilitate the rapid installation of the composite crossarms on the strain power pole.

BRIEF DESCRIPTION OF THE DRAWINGS

FIGS. 1 to 6 are schematic diagrams illustrating a first exemplary embodiment of the present disclosure, in which:

FIG. 1 is a schematic structural diagram illustrating an overhead power distribution line 10;

FIG. 2 is a schematic structural diagram illustrating a composite crossarm 102;

FIG. 3 is a schematic structural diagram illustrating a strain fixture 103;

FIG. 4 is a schematic structural diagram illustrating an end fitting 1024 of the composite crossarm 102;

FIG. 5 is a schematic structural diagram illustrating the strain fixture 103 and the end fitting 1024 fixed to each other; and FIG. 6 is a schematic structural diagram illustrating the fixing device 106.

FIGS. 7 to 9 are schematic diagrams illustrating a second exemplary embodiment of the present disclosure, in which:

FIG. 7 is a schematic structural diagram illustrating an overhead power distribution line 20;

FIG. 8 is a schematic structural diagram illustrating a top-phase strain fixture 205; and FIG. 9 is a schematic structural diagram illustrating a hoop mechanism 207 for fixing a top-phase crossarm 204.

FIGS. 10 to 11 are schematic diagrams illustrating a third exemplary embodiment of the present disclosure, in which:

FIG. 10 is a schematic structural diagram illustrating an overhead power distribution line 30; and FIG. 11 is a schematic structural diagram illustrating a fixing device 307.

DETAILED DESCRIPTION OF THE EMBODIMENTS

Specific exemplary embodiments of the present disclosure will be described below. However, it should be understood that the exemplary embodiments described below are merely typical examples of the present disclosure, and they may be embodied in various forms. Therefore, the specific details described herein are not to be considered as limitation, but merely as a basis for the claims and as a representative basis for teaching the person skilled in the art to variously apply the present disclosure in any appropriate manner in practice, including the use of various features disclosed herein in combination with features which may not be explicitly disclosed herein.

First Exemplary Embodiment

Figure 1:
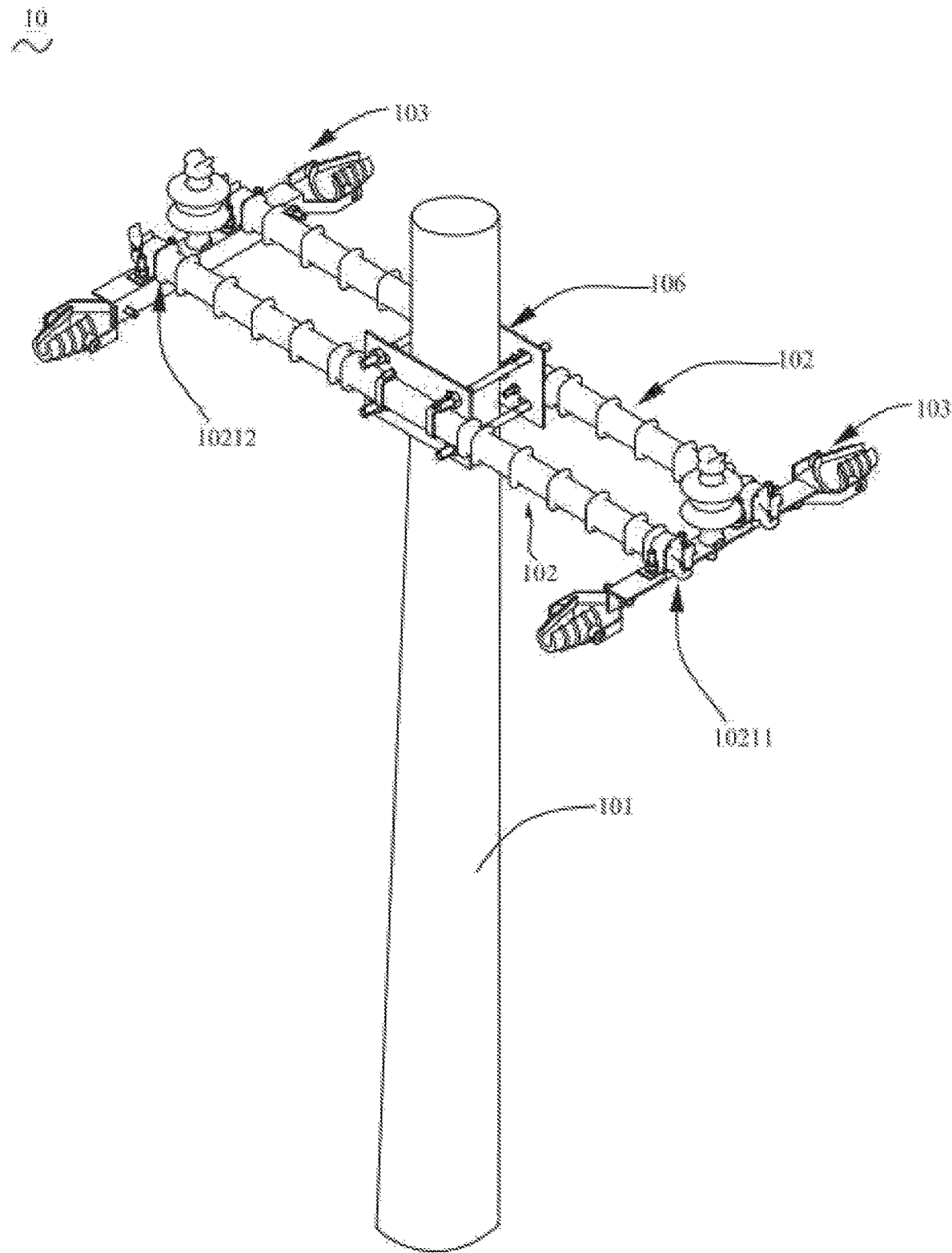

Please refer to FIG. 1 to FIG. 6 together. As shown in FIG. 1, the overhead power distribution line 10 includes a strain power pole 101, two composite crossarms 102, and a strain fixture 103. A middle portion of the composite crossarm 102 is horizontally fixed to the strain power pole 101, and ends of the composite crossarms 102 are connected to the strain fixture 103. The strain fixture 103 enables the two composite crossarms 102 to be integrally connected, and the strain fixture 103 is adapted to fix a conducting wire.

Specifically, the middle portion of the composite crossarm 102 is horizontally fixed to the strain power pole 101 so that both ends 10211, 10212 of the composite crossarm 102 are free ends. The term "middle portion" mentioned here not only refer to a centre of the composite crossarm 102, but areas other than the two ends 10211, 10212. The advantage of such fixation lies in that one composite crossarm 102 can be used to fix two-phase conducting wires.

The two composite crossarms 102 are fixed on the strain power pole 101 in a state where the two composite crossarms 102 are parallel to each other on a same horizontal plane and are located on both sides of the strain power pole 101 respectively. The ends 10211, 10212 of the two composite crossarms 102, which are located on a same side of the strain power pole 101, are both connected to the strain fixture 103. The strain fixtures 103 enable the two composite crossarms 102 to be integrally connected, to form a rectangular shape. The strain fixtures 103 at both ends are adapted to fix the conducting wires, which enables the fixation of two-phase conducting wires.

In this way, two composite crossarms 102 are fixed on a same horizontal plane of the strain power pole 101, so that when a conducting wire passes through the strain fixture 103 for fixation, the two composite crossarms 102 can share the longitudinal strain required by the strain line to satisfy requirements of use. Further, with the composite of bodies of the composite crossarms 102, a dry arcing distance is significantly increased, and electrical lightning resistance performance is enhanced, preventing accidents such as line disconnection and flashover caused by lightning strike. The composite crossarms 102 are maintenance-free and do not require periodical inspection and maintenance, so labor cost is significantly reduced. The use of composite crossarms 102 can also eliminate the use of strain insulators, that is to say, there is no strain insulator between the composite crossarm 102 and the strain fixture 103, in other words, between the composite crossarm 102 and the conducting wire, so the configuration of the line can be simplified.

Figure 2:
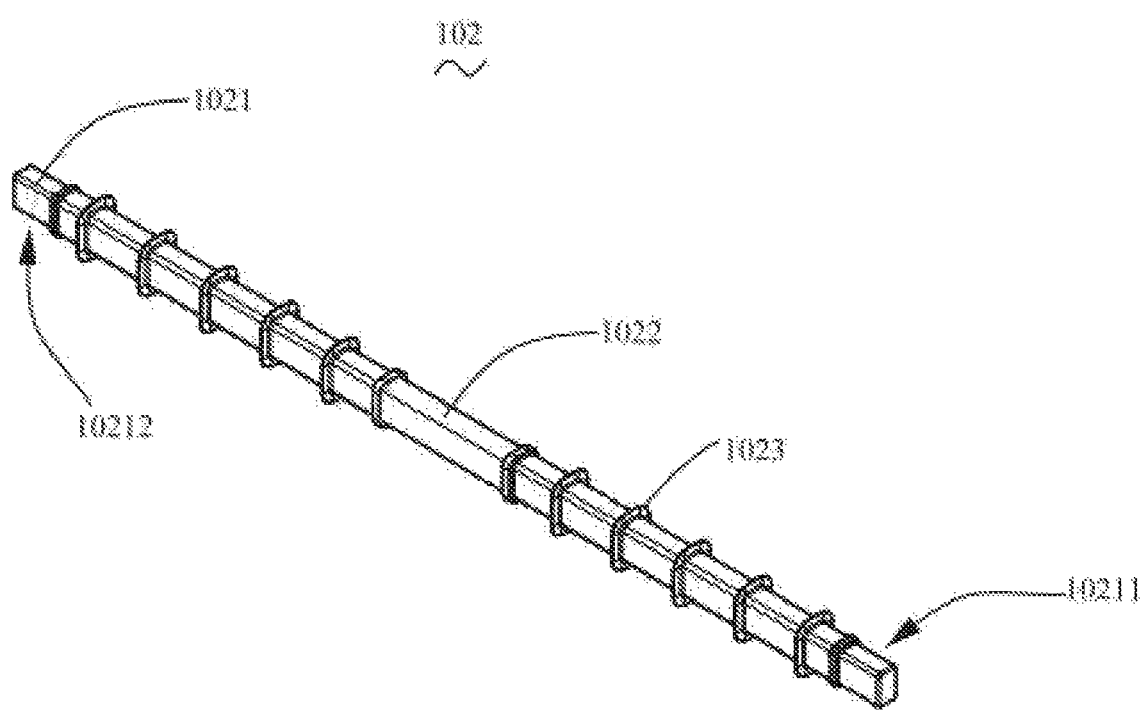

In this exemplary embodiment, as shown in FIG. 2, the composite crossarm 102 includes a core rod 1021, a sleeve 1022, and a silicone rubber shed 1023. Both the sleeve 1022 and the silicone rubber shed 1023 are wrapped on an outer circumferential surface of the core rod 1021. After the sleeve 1022 is wrapped and fixed on the outer circumferential surface of the core rod 1021, the silicone rubber shed 1023 is formed on the core rod 1021 at areas other than the sleeve

1022. An exposed end of the core rod 1021 is fixed to an end fitting, which will be introduced in detail later.

Specifically, the core rod 1021 is a rectangular solid rod, which is pultruded by glass fiber reinforced epoxy resin. The rectangular core rod 1021 has an arc-shaped outer periphery to avoid being affected by the concentration of force. Compared with a circular core rod 1021 with a same cross-sectional area, the core rod 1021 can reduce the material cost and has good bending strength. Of course, it can be understood that, in other embodiments, the core rod 1021 may also be a hollow tube, and the cross section of the core rod 1021 may also be circular or polygonal.

The silicone rubber shed 1023 is used for the outer insulation of the composite crossarm 102. The silicone rubber shed has good aging resistance, and stable and reliable electrical performance, and can achieve maintenance-free life cycle of nearly thirty years. However, such kind of silicone rubber shed 1023 may be easy to be damaged when acted by a force for a long term, so that moisture may enter and corrode the core rod 1021. Therefore, in this exemplary embodiment, before the core rod 1021 is wrapped with the silicone rubber shed 1023, the sleeve 1022 is sleeved on the core rod 1021 and fixed by pressing or binding. After the sleeve 1022 is bond on the core rod 1021, the sleeve 1022 can be integrally injected with silicone rubber shed 1023 on both sides of the sleeve 1022.

The sleeve 1022 may be optionally a metal sleeve 1022, such as a steel pipe.

In this way, when the middle portion of the composite crossarm 102 is fixed to the strain power pole 101, the force can be acted on the sleeve 1022 located in the middle portion, thereby avoiding damage to the silicone rubber shed 1023.

Figure 3:
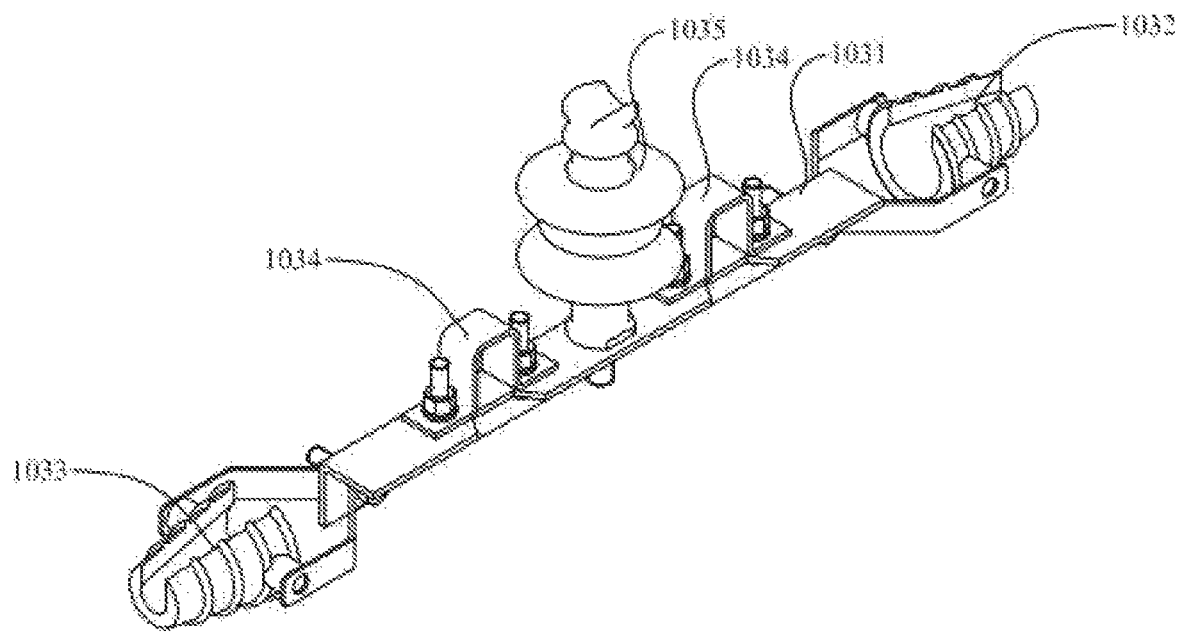

In this exemplary embodiment, as shown in FIG. 3, the strain fixture 103 includes an angle steel 1031, conducting wire clamps 1032 and 1033 located on both sides of the angle steel 1031, and two hoops 1034 disposed on the angle steel 1031. The angle steel 1031 cooperates with the two hoops 1034 to enable the two composite crossarms 102 to be integrally connected, and the conducting wire clamps 1032 and 1033 are adapted to fix the conducting wire.

Figure 4:
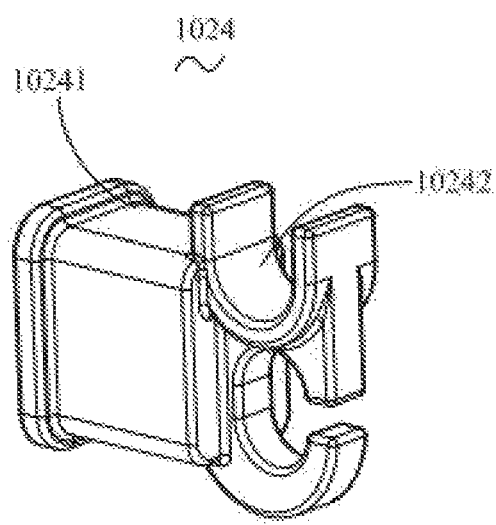

The ends of the composite crossarm 102 are fixed with end fittings 1024. The end fitting 1024 may be optionally a metal sleeve with an open end or other similar sleeve mechanism. As shown in FIG. 4, in this exemplary embodiment, the end fitting 1024 is a fitting with an opening 10241 at one end, and the opening 10241 is adapted to be arranged on and cover the end 10211 or the end 10212 of the core rod 1021. The other side of the opening 10241 is provided with a wire binding slot 10242. If necessary, the wire can be bond to improve the universality of use of the end fitting 1024.

Figure 5:
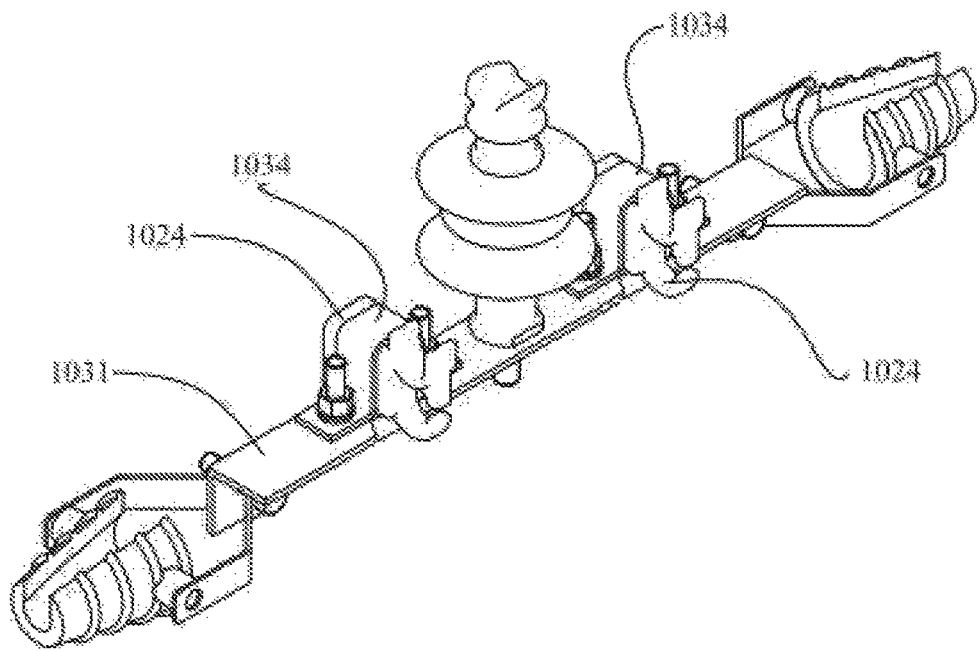

As shown in FIG. 5, when the end fittings 1024 are fixed to the strain fixture 103, the two hoops 1034 are sleeved on the end fittings 1024 respectively, and the hoops 1034 are fixedly connected to the angle steel 1031 through bolts. It can be seen that the angle steel 1031 and the hoops 1034 are cooperatively fixed on the outer periphery of the end fitting 1024 to prevent damage to the silicon rubber shed 1023 and to prevent the core rod 1021 from being corroded by moisture. In this way, the strain fixture 103 is fixed on the composite crossarms 102, so that the two composite crossarms are integrally connected to share the longitudinal strain of the conducting wire acted on the strain fixture 103.

In this exemplary embodiment, a pin type insulator 1035 is also fixed to the angle steel 1031 of a strain fixture 103.

The pin type insulator 1035 is located in the middle of the two composite crossarms 102 and is adapted to support a conducting wire.

Specifically, the pin type insulator 1035 may be optionally a composite insulator, a glass insulator, or a ceramic insulator. The pin type insulator 1035 is fixed above the strain fixture 103 to support the conducting wire to span from one side of the strain power pole 101 to the other side, which avoids abrasion and non-directionality of the conducting wire.

Figure 6:
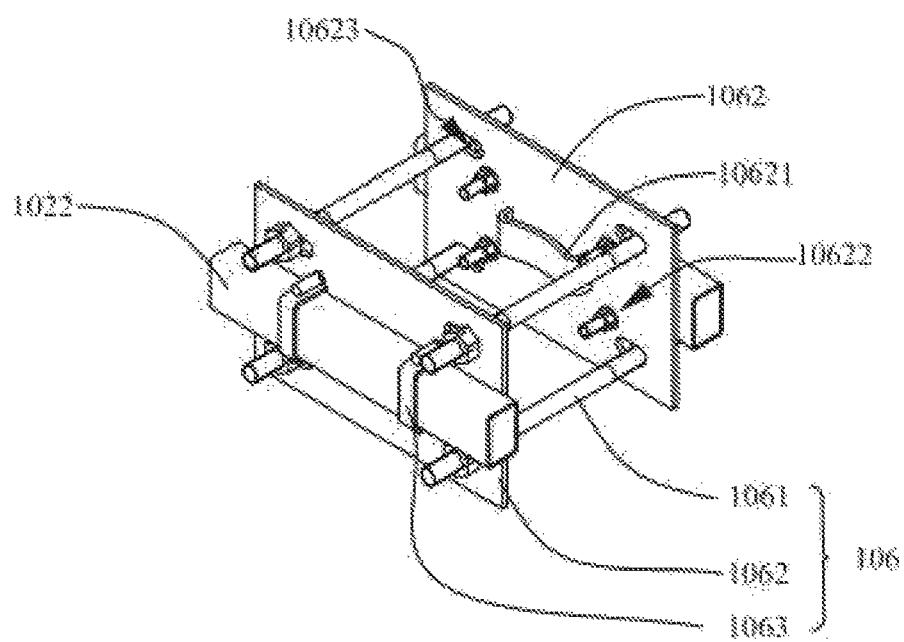

In this exemplary embodiment, please refer to FIG. 1 and FIG. 6 together. The composite crossarms 102 are fixed to the strain power pole 101 by a fixing device 106. The fixing device 106 includes a crossarm receiving member 1063, a pole connecting member 1061, and a connecting plate 1062. The crossarm receiving member 1063 is wrapped and fixed on the composite crossarm 102, the pole connecting member 1061 is fixed on the strain power pole 101, and the connecting plate 1062 is located between the composite crossarm 102 and the strain power pole 101. The connecting plate 1062 is adapted to fix the crossarm receiving member 1063 and the pole connecting member 1061, so that the composite crossarm 102 is fixed to the strain power pole 101.

The crossarm receiving member 1063 is wrapped and fixed on the composite crossarm 102, and the fixed position is on the sleeve 1022 of the composite crossarm 102. The sleeve 1022 has sufficient strength to bear the force. The shape of the cavity of the crossarm receiving member 1063 matches the shape of the core rod 1021. The crossarm receiving member 1063 may be optionally in an integrated structure or may include multiple different structures, as long as it can be fixedly connected to the connecting plate 1062 after being wrapped on the sleeve 1022.

The connecting plate 1062 is located between the composite crossarm 102 and the strain power pole 101. The shape of the connecting plate 1062 fits the shapes of the composite crossarm 102 and the strain power pole 101. As in this exemplary embodiment, the core rod 1021 of the composite crossarm 102 is in a rectangular shape, and the side of the connecting plate 1062 facing the composite crossarm 102 is a flat plate. In other embodiments, if the core rod of the composite crossarm is in a circular shape, a connecting mechanism may be added to the side of the connecting plate facing the composite crossarm to fit the shape of the core rod. The cross section of the strain power pole 101 is usually in a circular shape, so the side of the connecting plate 1062 facing the strain power pole 101 is provided with an arc-shaped member 10621, which can increase the area of contact between the connecting plate 1062 and the strain power pole 101, and improve the stability of the fixation.

The pole connecting member 1061 is fixed on the strain power pole 101. Optionally, the pole connecting member 1061 may be sleeved on the strain power pole 101 in a form of a mechanism similar to a hoop, and then the pole connecting member 1061 is connected to the connecting plate 1062. Alternatively, the pole connecting member 1061 may be attached to the periphery of the strain power pole 101, and then fixed to the connecting plate 1062. These will be described in detail below. In actual installation, since the two composite crossarms 102 need to be installed on the strain power pole 101 in parallel on a same horizontal plane, the pole connecting member 1061 may be generally shared.

Specifically, as shown in FIG. 6, the crossarm receiving member 1063 is in a form of two U-shaped hoops 1063, and the two U-shaped hoops 1063 are arranged on both sides of the strain power pole 101 respectively, which can balance the force. The pole connecting member 1061 is in a form of four bolts 1061. The bolt has threads at both ends. The connecting plate 1062 is provided with mounting holes 10622 corresponding to the two U-shaped hoops 1063 and mounting holes 10623 corresponding to the four bolts 1061.

Referring to FIG. 1 again, when two composite crossarms 102 are horizontally arranged on the strain power pole 101, each composite crossarm 102 corresponds to two U-shaped hoops 1063 and a connecting plate 1062. The two composite crossarms 102 share the four bolts 1061. The two U-shaped hoops 1063 pass through the mounting hole 10622 in the connecting plate 1062 to fix the composite crossarm 102 on the connecting plate 1062. The four bolts 1061 pass through the mounting holes 10623 in the connecting plates 1062 on both sides of the strain power pole 101 respectively, which enables both the two composite crossarms 102 to be fixed to the strain power pole 101.

In this way, the two composite crossarms 102 share one pole connecting member 1061, which can greatly simplify the fixing device 106, reduce complexity of construction, and facilitate the rapid installation of the composite crossarms 102 on the strain power pole 101.

With the overhead power distribution line according to the first exemplary embodiment of the present disclosure, two composite crossarms 102 are horizontally fixed on the strain power pole 101, and the two composite crossarms 102 are integrally connected with the strain fixture 103 to share the longitudinal strain. When a conducting wire reach the strain power pole, the conducting wire can pass through the wire clamp on one side of the strain fixture, be supported by a pin type insulator, and extend to the wire clamp on the other side, which can realize the arrangement of the strain power pole 101 in a 10 kV or 35 kV power distribution network. The strain power pole 101 of such measure is suitable for open and thunderstorm areas. Compared with the lightning protection measures of lightning insulators or additional installation of lightning arresters, it has high electrical stability without the requirement of regular inspection and maintenance, and it also can prevent line disconnection accidents and reduce labor costs.

Second Exemplary Embodiment

Figure 7:
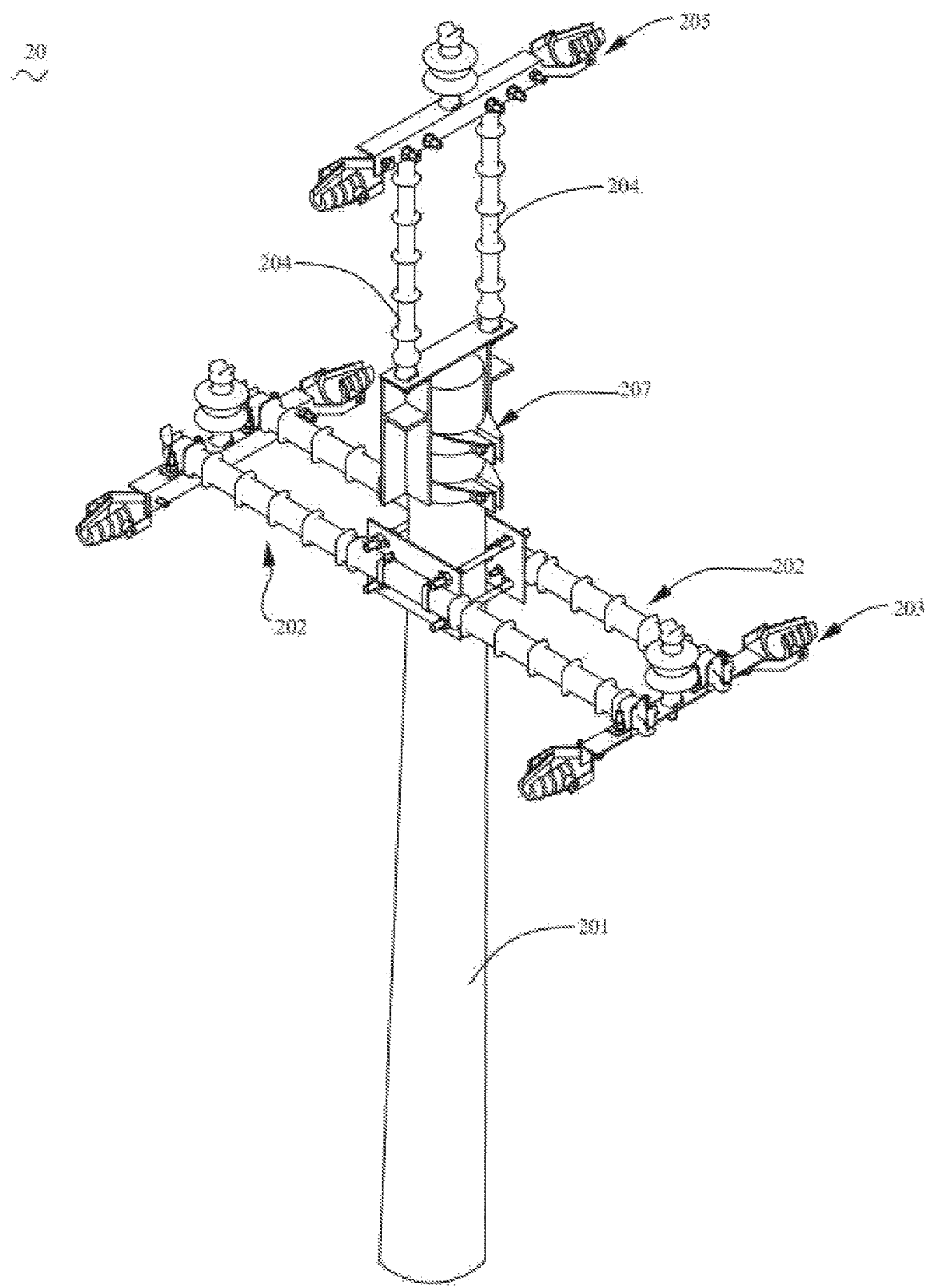

As shown in FIG. 7, the overhead power distribution line 20 in this exemplary embodiment includes: a strain power pole 201, two composite crossarms 202, and a strain fixtures 203. The middle portion of the composite crossarm 202 is horizontally fixed to the strain power pole 201. The strain fixtures 203 is connected to ends of the composite crossarms 202. The strain fixture 203 enables the two composite crossarms 202 to be integrally connected, and the strain fixture 203 is adapted to fix the conducting wire.

In addition, the overhead power distribution line 20 also includes two top-phase crossarms 204 vertically fixed to a top end of the strain power pole 201 away from the ground, and ends of the top-phase crossarms 204 are connected to a top-phase strain fixture 205. The top-phase strain fixture 205 enables the two top-phase crossarms 204 to be integrally connected, and the top-phase strain fixture 205 is adapted to fix the conducting wire.

Specifically, the two top-phase crossarms 204 are fixed on the top of the strain power pole 201 in a state where two top-phase crossarms 204 are parallel in a same vertical plane and are located on both sides of the strain power pole 201 in an upward extending direction, the top-phase strain fixture 205 is connected to the ends of the two top-phase crossarms 204, and the top-phase strain fixture 205 enables the two top-phase crossarms 204 to be integrally connected to form a rectangular shape. The top-phase strain fixture 205 is adapted to fix the conducting wire.

The two top-phase crossarms 204 and the two composite crossarms 202 together can form an arrangement of a single loop three-phase conducting wire for the strain power pole. For example, the top-phase strain fixture 205 on the two top-phase crossarms 204 can realize the fixation for a medium-phase conducting wire, while the two strain fixtures 203 at both ends of the two composite crossarms 202 can realize the fixation for side-phase conducting wires, which enables a stable and reliable configuration of the conducting wire and a high level of lightning resistance.

The top-phase crossarm 204 mentioned above may be optionally a composite insulator 204. The composite insulator 204 is in a configuration where a core rod is covered by a silicone rubber shed. The core rod may be pultruded from glass fiber reinforced epoxy resin. Alternatively, and the core rod may be a circular solid core rod. Of course, it can be understood that, in other embodiments, the core rod may be a hollow tube, and the cross section of the core rod may be in a rectangular shape.

Figure 8:
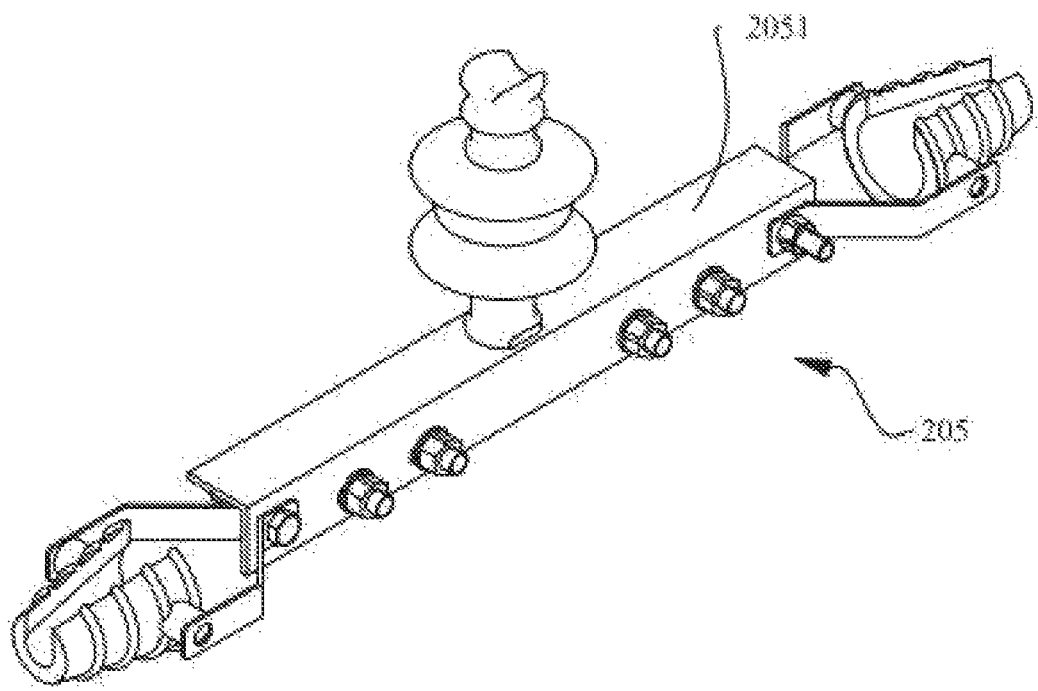
Figure 9:
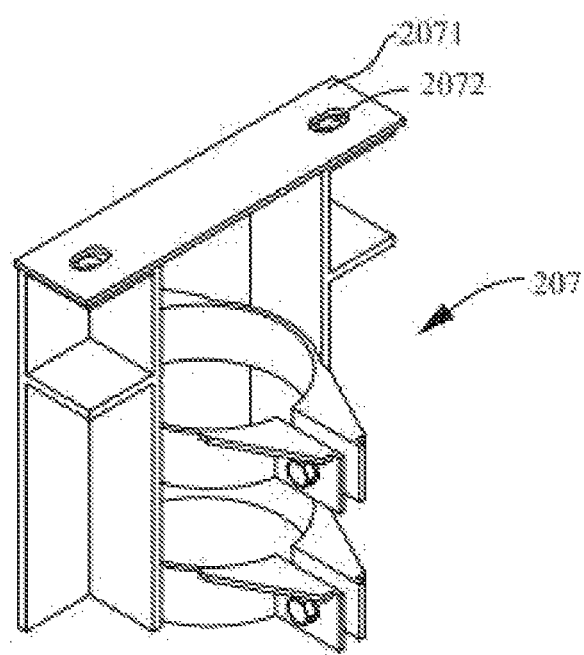

The structure of the top-phase strain fixture 205 is similar to the structure of the strain fixture 103 in the first exemplary embodiment, as shown in FIG. 8, except that the number and positions of the mounting holes of the angle steel 2051 on the top-phase strain fixture 205 are different, which are suited to the structure of fittings of the composite insulator 204, and cooperate with each other to achieve a fixed connection.

In this exemplary embodiment, the two composite insulators 204 are connected to the top end of the strain power pole 201 through a hoop mechanism 207. The hoop mechanism 207 can be sleeved on the strain power pole 201. The top of the hoop mechanism 207 is provided with a tab 2071, and the tab 2071 is provided with two mounting holes 2072. The end fitting of the composite insulator 204 is a screw rod (not shown in figures). The screw rod is adapted to pass through the mounting hole 2072, and be tightened by a nut, in this way, two composite insulators 204 can be fixed on one tab 2071.

Third Exemplary Embodiment

Figure 10:
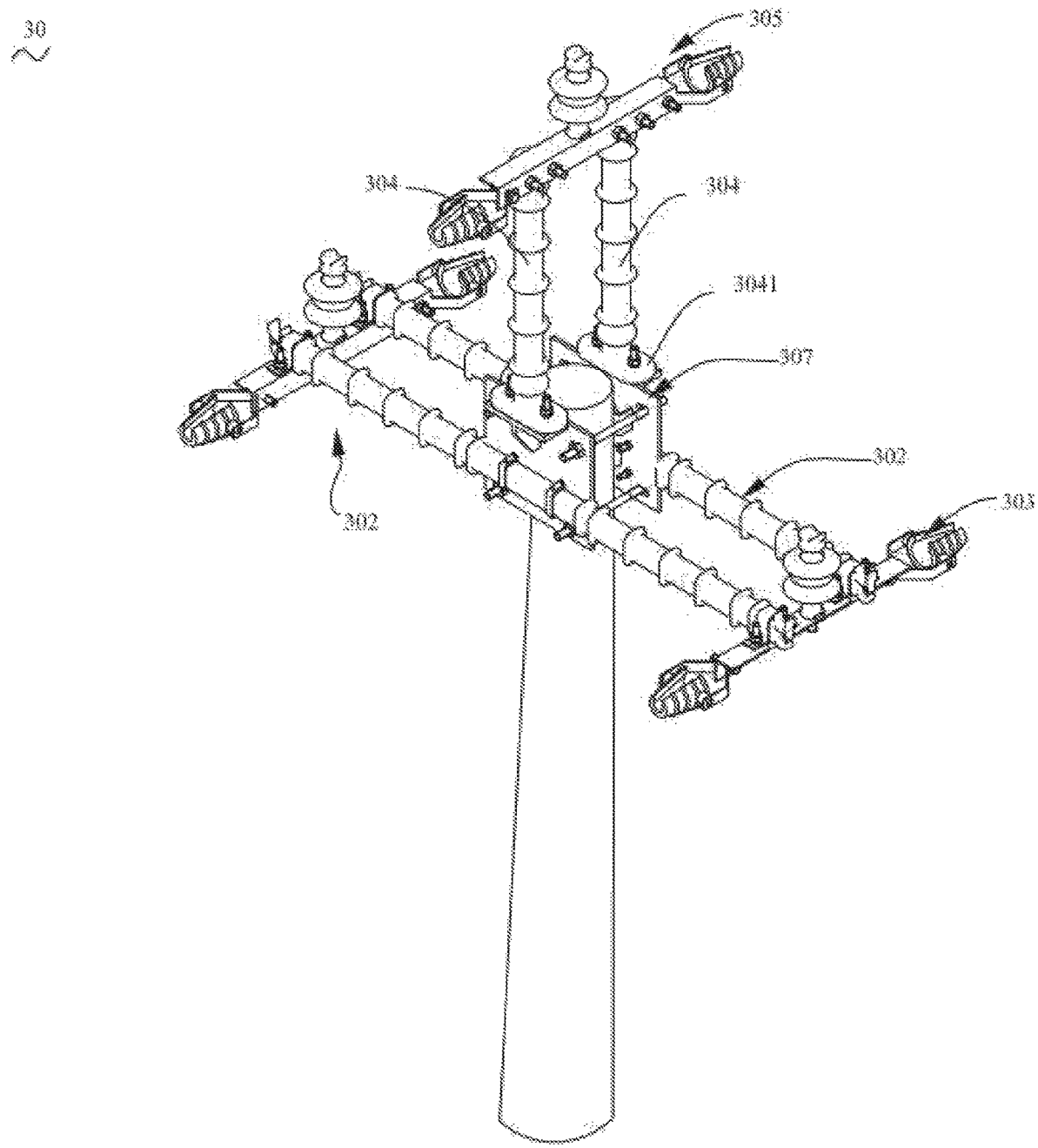
Figure 11:
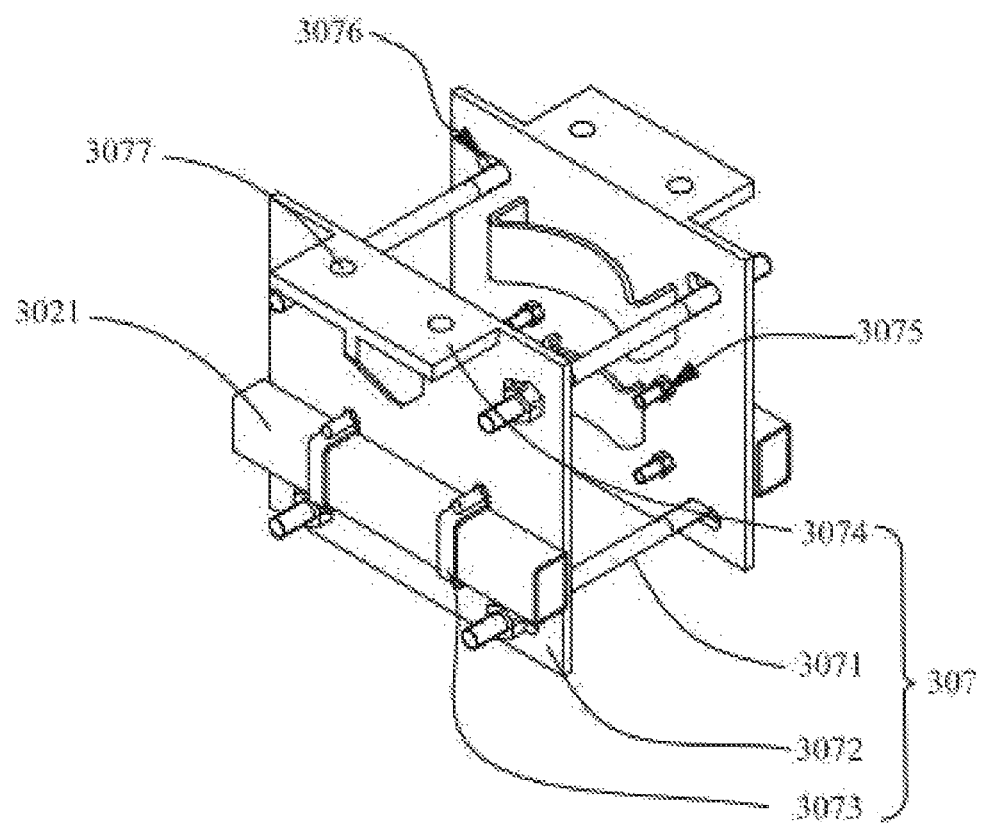

Please refer to FIG. 10 and FIG. 11 together. The overhead power distribution line 30 according to this exemplary embodiment includes: a strain power pole 301, two composite crossarms 302, and a strain fixture 303. A middle portion of the composite crossarm 302 is horizontally fixed to the strain power pole 301. Ends of the composite crossarms 302 are connected to the strain fixture 303. The strain fixture 303 enables the two composite crossarms 302 to be integrally connected. The strain fixture 303 is adapted to fix the conducting wire.

The overhead power distribution line 30 further includes two top-phase crossarms 304, which are vertically fixed to the top end of the strain power pole 301 away from the ground. The ends of the top-phase crossarms 304 are connected to a top-phase strain fixture 305. The top-phase strain fixture 305 enables the two top-phase crossarms 304 to be integrally connected, and the top-phase strain fixture 305 is adapted to fix the conducting wire.

In this exemplary embodiment, the composite crossarm 302 is fixed to the strain power pole 301 by a fixing device 307. The fixing device 307 includes a crossarm receiving member 3073, a pole connecting member 3071, and a connecting plate 3072. The crossarm receiving member 3073 is wrapped and fixed on the composite crossarm 302, the pole connecting member 3071 is fixed on the strain power pole 301, the connection plate 3072 is located between the composite crossarm 302 and the strain power pole 301, and the connecting plate 3072 is adapted to fix the crossarm receiving member 3073 and the pole connecting member 3071 to fix the composite crossarm 302 to the strain power pole 301.

Specifically, the crossarm receiving member 3073 is in a form of two U-shaped hoops 3073, and the two U-shaped hoops 3073 are arranged on both sides of the strain power pole 301 respectively. The pole connecting member 3071 is in a form of four bolts 3071, and the connecting plate 3072 is provided with mounting holes 3075 corresponding to the two U-shaped hoops 3073, and the mounting holes 3076 corresponding to the four bolts 3071.

The difference from the fixing device 106 in the first exemplary embodiment is that the connecting plate 3073 of the fixing device 307 is further provided with a supporting plate 3074, and the supporting plate 3074 is provided with mounting holes 3077 corresponding to the end fittings 3041 of the top-phase crossarm 304, to fix the top-phase crossarm 304 to the supporting plate 3074.

In this way, the fixation of the composite crossarm 303 and the top-phase crossarm 304 can be realized through one connecting plate 3073, which simplifies the fixing device 307 and facilitates installation.

In order to describe the fixing device 307 in more detail, a specific installation scenario will be described below as an example.

First, before mounting the composite crossarm 303 on the strain power pole 301, two U-shaped hoops 3073 may be fixed on the sleeve 3021 of the composite crossarm 302. The two U-shaped hoops 3073 are arranged on both sides of the strain power pole 301 to make balance in force. The two U-shaped hoops 3073 are respectively provided with threads. The two U-shaped hoops 3073 may pass through the mounting holes 3075 in the connection plate 3072, and be tightened by nuts. The other composite crossarm 302 may be arranged in the same way, so as to complete the fixation of the two composite crossarms 302 to the connecting plate 3072.

Then, two composite crossarms 302 are horizontally arranged on the strain power pole 301. After the bolts 3071 pass through the corresponding mounting holes 3076 in the connecting plate 3072 on both sides, they are tightened by nuts, so as to complete the fixation of the two composite crossarms 302 to the strain power pole 301.

The top-phase crossarm 304 is mounted on the supporting plate 3074 of the connecting plate 3072 and is tightened by bolts. The top-phase crossarm 304 on the other side is installed in the same way.

The installation of the fixing device 307 may be completed by the method mentioned above. It can be understood that the installation of the fixing device 307 is no limited to the above method, and the fixing device 307 may be installed in other methods. For example, before arranging on the strain power pole 301, the bolts 3071 may pass through the corresponding mounting holes 3076 in the connecting plates 3072 on both sides and be fastened by nuts to complete the fixation of the two composite crossarms 302 to the bolts 3071, and then the two composite crossarms 302 are sleeved on the strain power pole 301. It can be seen from the installation process that the fixing device 307 completes the installation of the composite crossarms 302 and the top-phase crossarms 304 through a common connecting plate 3072, and the installation of the two composite crossarms 302 through common bolts 3071, which obviously simplifies the installation process and reduces the complexity of construction.

Fourth Exemplary Embodiment

Figure 12:
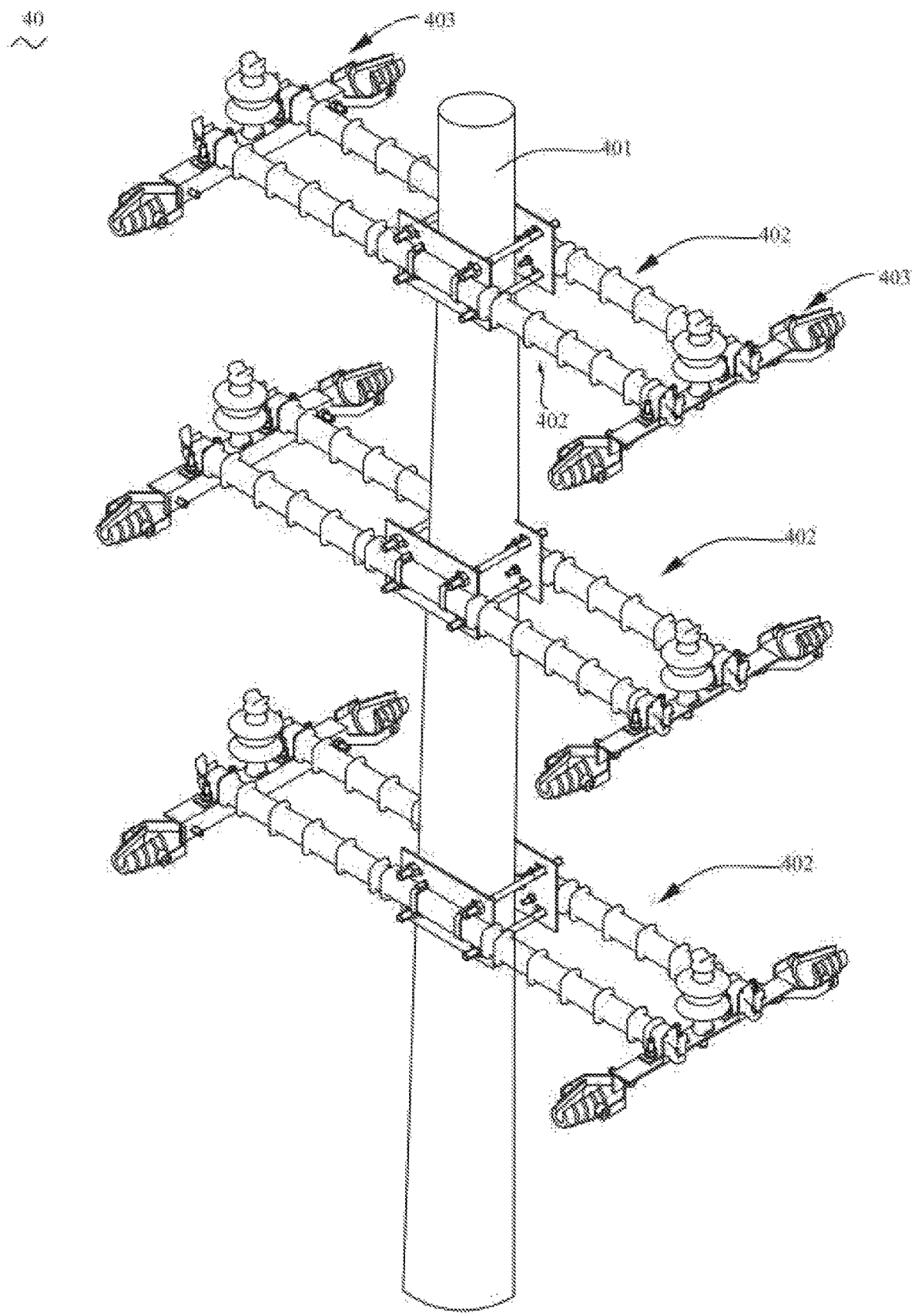
FIG. 12 is a schematic structural diagram illustrating an overhead power distribution line 40 according to a fourth exemplary embodiment of the present disclosure.

As shown in FIG. 12, the overhead power distribution line 40 includes a strain power pole 401, two composite crossarms 402, and a strain fixture 403. The middle portion of the composite crossarm 402 is horizontally fixed to the strain power pole 401. The ends of the composite crossarms 402 are connected to the strain fixture 403. The strain fixture 403 enables the two composite crossarms 402 to be integrally connected. The strain fixture 403 is adapted to fix the conducting wire.

The two composite crossarms 402 are defined as a group of composite crossarms 402. A plurality of such groups of composite crossarms 402 are sequentially arranged on the strain power pole 401 to form three groups of composite crossarms 402. Ends of two composite crossarms 402 in each group are connected to the strain fixture 403. That is, the overhead power distribution line 40 also includes two other groups of composite crossarms 402 and corresponding strain fixtures 403. In this way, an arrangement of double loops six-phase conducting wire on a same pole can be realized.

Of course, it can be understood that in other exemplary embodiments, the length and cross-sectional size of the composite crossarms in each group may be different, and may be selected according to actual needs.

The overhead power distribution line in this exemplary embodiment can realize the arrangement of the double loops six-phase conducting wire of the strain power poles, which enables a good electrical stability and a high level of resistance to lightning strikes, and can prevent line disconnection accidents caused by lightning strike.

The technical content and technical features of the present disclosure have been disclosed as above. However, it can be understood that, under the creative concept of the present disclosure, those skilled in the art can make various changes and improvements to structures and materials mentioned above, including the combination of those technical features disclosed or claimed separately herein. It is obvious to include other combinations of these features. These variations and/or combinations all fall into the technical field to which the present disclosure pertains, and fall into the protection scope of the claims of the present disclosure.

What is claimed is:

1. An overhead power distribution line, comprising:
    a strain power pole;
    at least two composite crossarms, each of the crossarms having an end and a middle portion; and
    a strain fixture adapted to fix a conducting wire,
    wherein the middle portions are coupled substantially perpendicular to the strain power pole such that the ends of the crossarms are free ends, and wherein the ends of the crossarms are connected to the strain fixture, thereby coupling the crossarms to each other, and
    wherein the strain fixture includes an angle steel having opposing ends and at least two hoops are disposed on the angle steel, and the angle steel cooperates with the hoops to couple the crossarms together.

2. The overhead power distribution line according to claim 1, wherein each of the crossarms includes a core rod, a sleeve, and a silicone rubber shed, wherein the sleeve and the silicone rubber shed are at least partially wrapped on an outer circumferential surface of the core rod, and wherein the silicone rubber shed is formed on the core rod at areas not wrapped by the sleeve.

3. The overhead power distribution line according to claim 2, wherein the core rod is a glass fiber reinforced epoxy pultrusion rod.

4. The overhead power distribution line according to claim 2, wherein the core rod is one of either of a hollow tube and a solid rod, and wherein the core rod has a cross section in a shape of one of a rectangle, a circle, and a polygon.

5. The overhead power distribution line according to claim 1, further comprising at least two top-phase crossarms, wherein the top-phase crossarms are coupled substantially parallel to an end of the strain power pole away from ground, and ends of the top-phase crossarms are coupled to a top-phase strain fixture that couples the top-phase crossarms together, and wherein the top-phase strain fixture is adapted to fix the conducting wire.

6. The overhead power distribution line according to claim 5, wherein the top-phase crossarms are composite insulators.

7. The overhead power distribution line according to claim 1, wherein a pin type insulator is fixed on the strain fixture, and wherein the pin type insulator is disposed between the crossarms and adapted to support the conducting wire.

8. The overhead power distribution line according to claim 1, wherein first and second wire clamps are respectively located on the opposing ends of the angle steel, and wherein the first and second wire clamps are adapted to fix the conducting wire.

9. The overhead power distribution line according to claim 8, wherein end fittings are respectively coupled to the ends of the crossarms, and wherein the hoops are coupled to the angle steel after being sleeved on the respective end fittings of the crossarms.

10. The overhead power distribution line according to claim 1, wherein the crossarms are coupled to the strain power pole using a fixing device, wherein the fixing device includes first and second crossarm receiving members, a pole connecting member, and first and second connecting plates, wherein the first and second crossarm receiving members are wrapped and respectively coupled to the crossarms, wherein the pole connecting member is coupled to the strain power pole, wherein the first and second connecting plates are disposed between one of the crossarms and the strain power pole, and wherein the first and second connecting plates are adapted to couple the first and second crossarm receiving members to the pole connecting member.

11. The overhead power distribution line according to claim 10, wherein the first and second crossarm receiving members are U-shaped hoops, wherein the U-shaped hoops are respectively arranged on sides of the strain power pole, wherein the pole connecting member includes at least four bolts, and wherein each of the first and second connecting plates is provided with first mounting holes corresponding to the U-shaped hoops and second mounting holes corresponding to the bolts; and wherein when the crossarms are coupled to the strain power pole, one of the crossarms is received by the first crossarm receiving member and the first connecting plate, another of the crossarms is received by the second crossarm receiving member and the second connecting plate, the first and second crossarm receiving members respectively pass through the first mounting holes in the first and second connecting plates to respectively couple the crossarms to the first and second connecting plates, and the bolts pass through the first and second connecting plates on sides of the strain power pole to couple the crossarms to the strain power pole.

* * * * *